United States Patent [19]
Yonezawa

[11] Patent Number: 5,865,110
[45] Date of Patent: Feb. 2, 1999

[54] PEELER FOR FRUITS AND VEGETABLES

[75] Inventor: Tooru Yonezawa, Takamatsu, Japan

[73] Assignee: Yugenkaisha Asahitekkin, Japan

[21] Appl. No.: 63,288

[22] Filed: Apr. 21, 1998

[51] Int. Cl.[6] .............................. A47J 17/00; B26B 11/00; B26B 29/00

[52] U.S. Cl. .......................... 99/588; 30/279.6; 30/280; 30/304; 30/123.5; 99/584

[58] Field of Search ...................... 99/584, 588, 542–545, 99/537; 30/123.5, 123.6, 123.7, 303, 304, 294, 279.6, 280, 143, 147–150, 222, 323, 338; 294/5; D7/695

[56] References Cited

U.S. PATENT DOCUMENTS

| | | | |
|---|---|---|---|
| D. 114,672 | 5/1939 | Coughlan | D7/695 |
| D. 354,888 | 1/1995 | Cousins | D7/695 |
| 691,861 | 1/1902 | Hemstrom | 30/280 X |
| 2,106,796 | 2/1938 | De Vault | 30/280 X |
| 2,238,425 | 4/1941 | Morris | 99/588 X |
| 2,266,278 | 12/1941 | Senkewitz | 99/588 X |
| 2,274,815 | 3/1942 | Whann | 99/588 X |
| 2,355,312 | 8/1944 | Lui | 99/588 |
| 2,556,528 | 6/1951 | Elkington | 99/588 |
| 2,614,324 | 10/1952 | Greenidge | 99/588 |
| 2,645,851 | 7/1953 | Ferrin | 30/123.5 |
| 2,986,813 | 6/1961 | De Vault | 30/123.5 |
| 5,279,035 | 1/1994 | Cohen et al. | 99/588 X |

*Primary Examiner*—Timothy F. Simone
*Attorney, Agent, or Firm*—Lorusso & Loud

[57] ABSTRACT

A peeler for fruits and vegetables having a handle for gripping the peeler and having a pair of head portions which diverge from a fore end of the handle and between which a cutting blade is supported. An elongated, generally rectangular plate member such as a thin plastic plate is fixedly secured to one of the head portions, whereby the cutting blade can peel the fruits and vegetables with one face of the plate member being maintained in sliding contact therewith when the peeler is moved relative to the fruits and vegetables in the direction from the fore end to opposite rear end of the handle.

9 Claims, 7 Drawing Sheets

PEELER FOR FRUITS AND VEGETABLES

BACKGROUND OF THE INVENTION

This invention relates to a kitchen utensil for peeling fruits and vegetables such as apples, potatoes and carrots.

One known peeler for vegetables having a columnar shape, such as carrot and Japanese radish, is shown in FIG. 8. The peeler has a handle 100 extending in a longitudinal direction for gripping the peeler and a pair of head portions 200a and 200b diverging from a fore end of the handle 100. A transversely extending cutting blade 300 is secured between the head portions 200a and 200b. The cutting blade 300 is composed of an elongated upper blade plate 301 and an elongated lower engaging plate 302 between which a slit 303 is defined.

In use, the peeler gripped at its handle 100 is positioned so that an edge of the blade plate 301 is in contact with a surface of an object to be peeled, e.g. Japanese radish Y. The peeler is then moved longitudinally downward as shown by the arrow so that the radish is peeled with the separated peel being passed through the slit 303. In this case, by maintaining the engaging plate 302 in contact with the radish Y, an excessive increase of the thickness of the peel can be prevented.

The known peeler has a problem in that the peeler is apt to be shift laterally. Further, with the conventional peeler, it is extremely difficult to peel a round fruit or vegetable such as an apple or a potato.

SUMMARY OF THE INVENTION

It is, therefore, an object of the present invention to provide a peeler capable of peeling fruits and vegetables of various shapes such as columnar and spherical shapes.

Another object of the present invention is to provide a peeler capable of peeling fruits and vegetables in a stable manner.

In accomplishing the foregoing objects, the present invention provides a peeler for fruits and vegetables comprising:

- a handle extending in a longitudinal direction for gripping said peeler and having opposing front and back surfaces bounded by longitudinally opposing fore and rear ends;
- a pair of first and second head portions diverging from said fore end and terminating at respective tip ends thereof such that said tip ends of said first and second head portions are transversely spaced apart from each other;
- a transversely extending cutting blade supported between said first and second head portions at positions adjacent said tip ends; and
- an elongated plate member having opposing first and second free ends, opposing third and fourth free ends and opposing first and second faces bounded by said first through fourth free ends, said first free end having a portion fixedly secured to said first head portion such that said plate member is disposed on the same side as said back surface.

Thus, the cutting blade can peel a fruit or vegetable, when a user grips the handle and displaces the peeler relative to the fruit or vegetable in the direction from the fore end to the rear end with a thumb of the user being maintained in contact with the second face of the plate member and with the first face of the plate member being maintained in sliding contact with the fruit or vegetable.

Since the fruit or vegetable is contacted with two spaced apart portions of the peeler, namely with the cutting blade and the plate member, the peeler is prevented from being unintentionally shifted in the direction normal to the displacing direction of the peeler. Further, a round fruit or vegetable can be peeled in a stable manner. These advantages become very significant, when the plate member is made of a resilient material such as a thin plastic plate.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
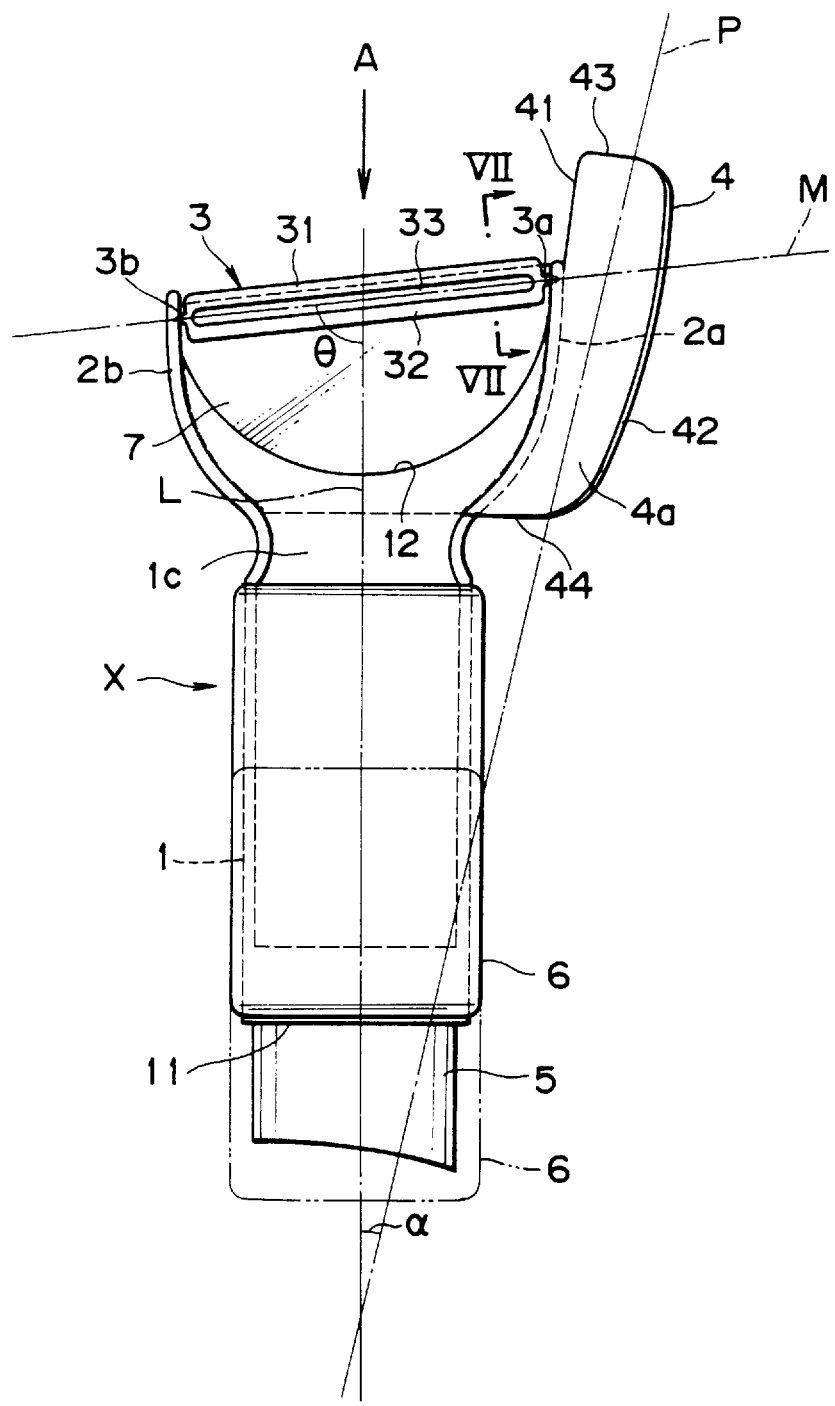
FIG. 1 is a plan view schematically illustrating a back surface of one embodiment of a peeler according to the present invention.
Figure 5:
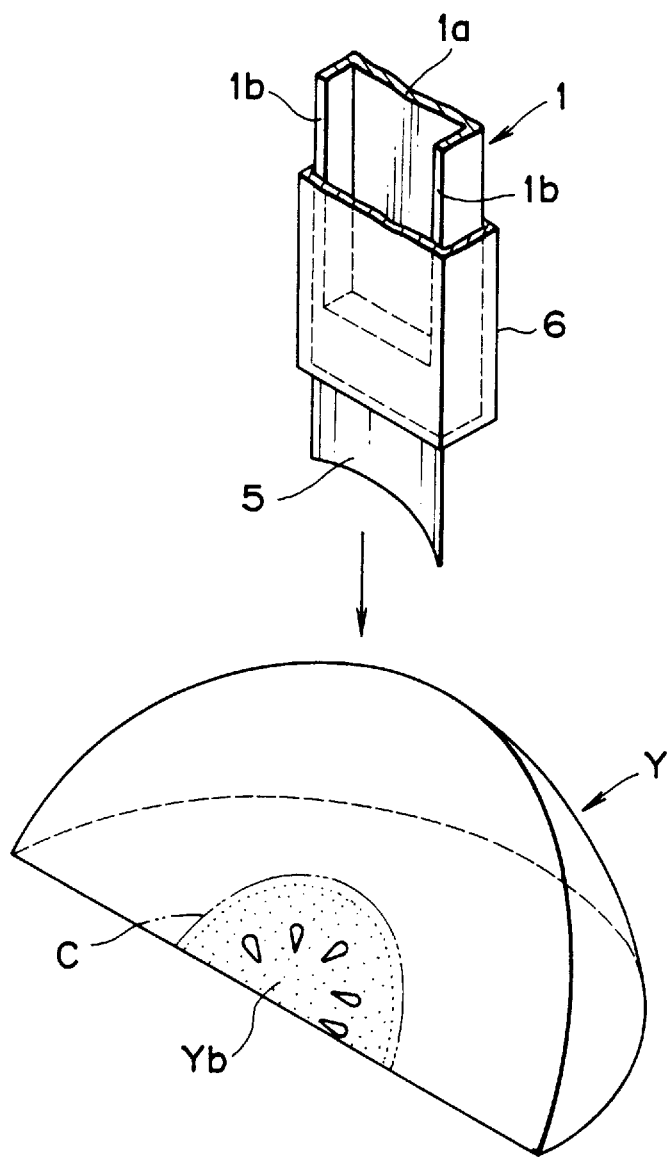
FIG. 5 is a fragmentary partial view of a rear end portion of the peeler of FIG. 1 illustrating the state for removing the core of a fruit.

Referring now to FIG. 1, designated generally as X is a peeler for fruits and vegetables according to the present invention. The peeler X has a handle 1 extending in a longitudinal direction L for gripping the peeler X. Preferably, the handle has a width of 30–40 mm and, as best seen in FIG. 5, a U-shaped cross section. Thus, the handle 1 includes a flat portion 1a and a bent portion 1b extending at periphery thereof in the direction from a front surface 1d toward a back surface 1c of the handle 1 (see FIG. 3).

The handle 1 has longitudinally opposing rear end 11 and fore end 12 from which a pair of first and second head portions 2a and 2b are branched. The first and second head portions 2a and 2b terminate at respective tip ends thereof such that the tip ends are transversely spaced apart from each other. In the illustrated embodiment, the handle 1 and the head portions 2a and 2b are integrally formed into a unitary structure by molding of a plastic material.

Figure 7:
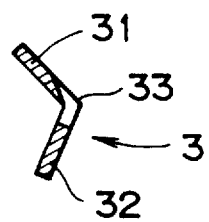
FIG. 7 is an enlarged sectional view taken along the line VII—VII in FIG. 1 and illustrating a cutting blade of the peeler.

A transversely extending cutting blade 3 made of, for example, a stainless steel, is supported between the first and second head portions 2a and 2b at positions adjacent the tip ends thereof. As shown in FIG. 7, the cutting blade 3 has a V-shaped cross section with its ridge portion being cut away to form a slit 33. Namely, the cutting blade 3 is composed of an elongated upper blade plate 31 and an elongated lower engaging plate 32 which are integrally connected at both ends and between which the slit 33 is defined. As shown in FIG. 1, protrusions 3a and 3b are formed at both ends of the cutting blade 3 and are loosely fitted and received in holes of the head portions 2a and 2b, respectively, so that the blade 3 is rotatable about its axis M. Stopper means (not shown) are provided on one or both of the head portions 2a and 2b to limit the angle of rotation of the blade 3 about the axis M, for example, within the range of 3°–15°.

As shown in FIG. 1, the first head portion 2a in this embodiment is slightly longer by, for example 5–10 mm, than the second head portion 2b and the cutting blade 3 is oriented at an angle slightly offset from the direction normal to the longitudinal axis L. For example, the angle $\theta$ between the blade axis M and handle axis L is 75°–85° so that the peeling effect is enchanced. The length of the cutting blade 3 is about 40–60 mm.

Figure 3:
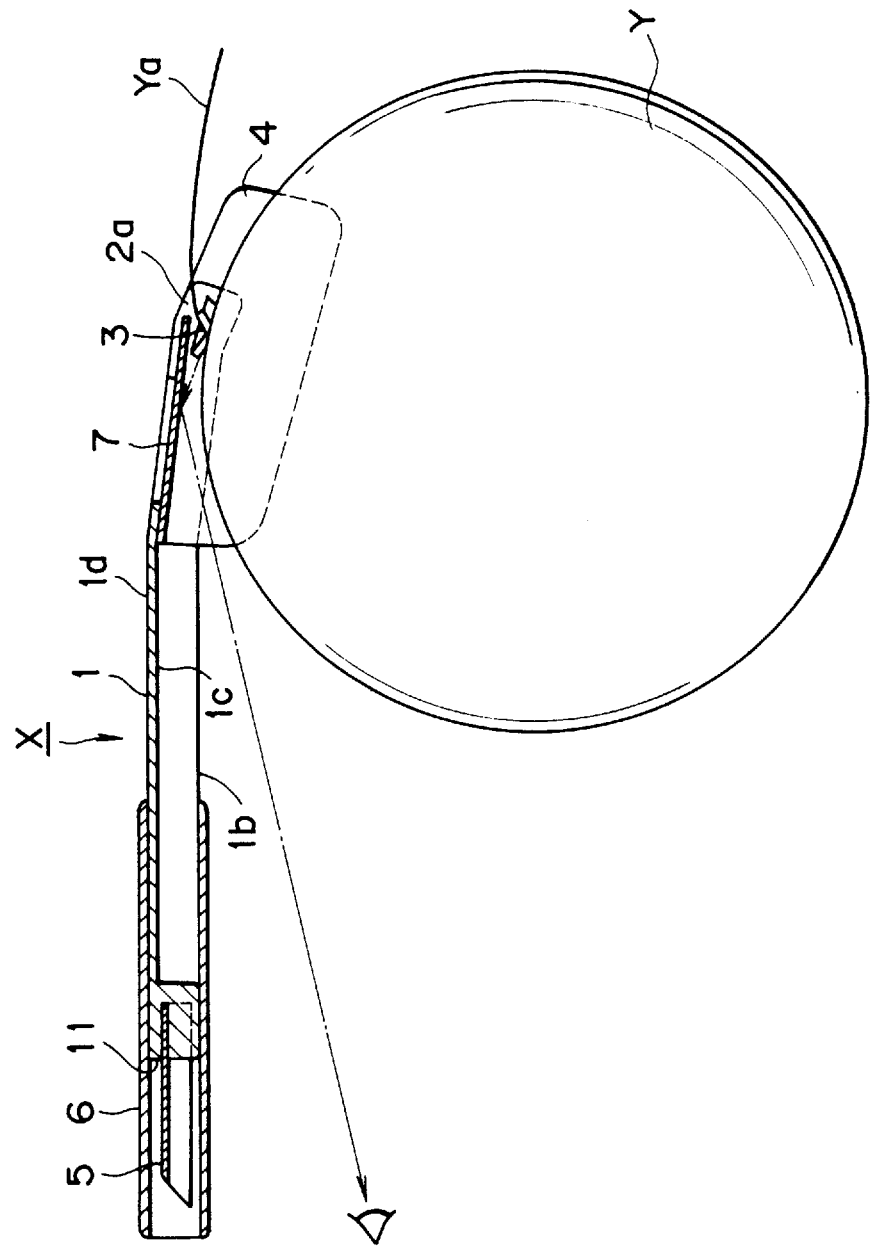
FIG. 3 is a sectional view taken along the line III—III in FIG. 2.

Secured to the first head portion 2a is an elongated plate member 4 having opposing first and second free ends 41 and 42, opposing third and fourth free ends 43 and 44 and opposing first and second faces 4a and 4b. The first and second faces 4a and 4b are bounded by the first through fourth free ends 41–44. The first free end 41 has a portion fixedly secured to the first head portion 2a such that the plate member 4 is disposed on the same side as the back surface 1c (see FIG. 3). The plate member 4 preferably has a longitudinal length of about 40–60 mm, a lateral width of about 20–30 mm and a thickness of about 0.5–1 mm. As shown in FIG. 3, the head portions 2a and 2b are slightly inclined toward the back surface 1c, so that the cutting operation is not hindered by the handle 1.

The plate member 4 may be made of the same material as a material of which the handle 1 and the head portions 2a and 2b are made. In this case, the plate member 4 and the head portions 2a may be integrally formed into a unitary structure by molding. Alternatively, the plate member 4 may be fixedly secured by any suitable means such as an adhesive or screws to the head portion 2a.

Figure 2:
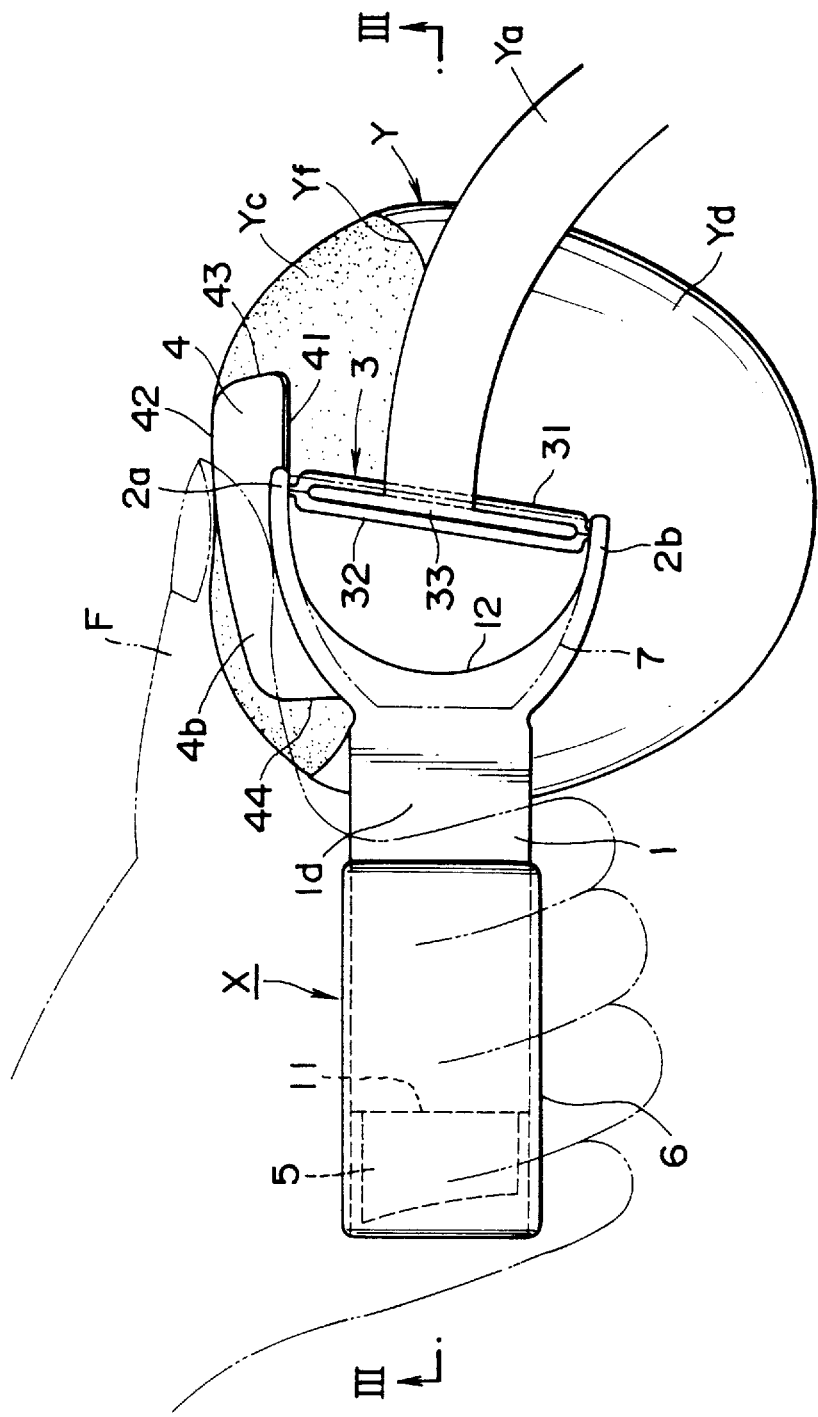
FIG. 2 is a plan view of a front surface of the peeler of FIG. 1 in one operating state.
Figure 6:
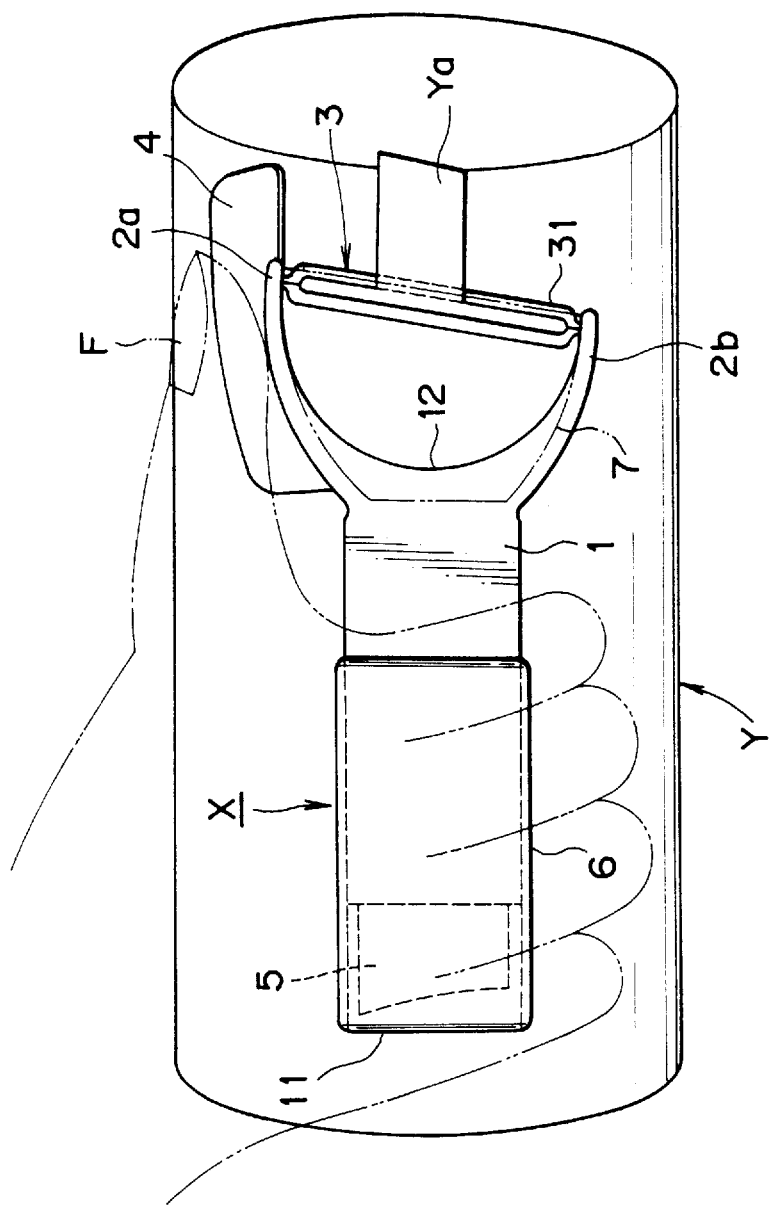
FIG. 6 is a view similar to FIG. 2 illustrating the peeler of FIG. 1 in another operating state.
Figure 8:
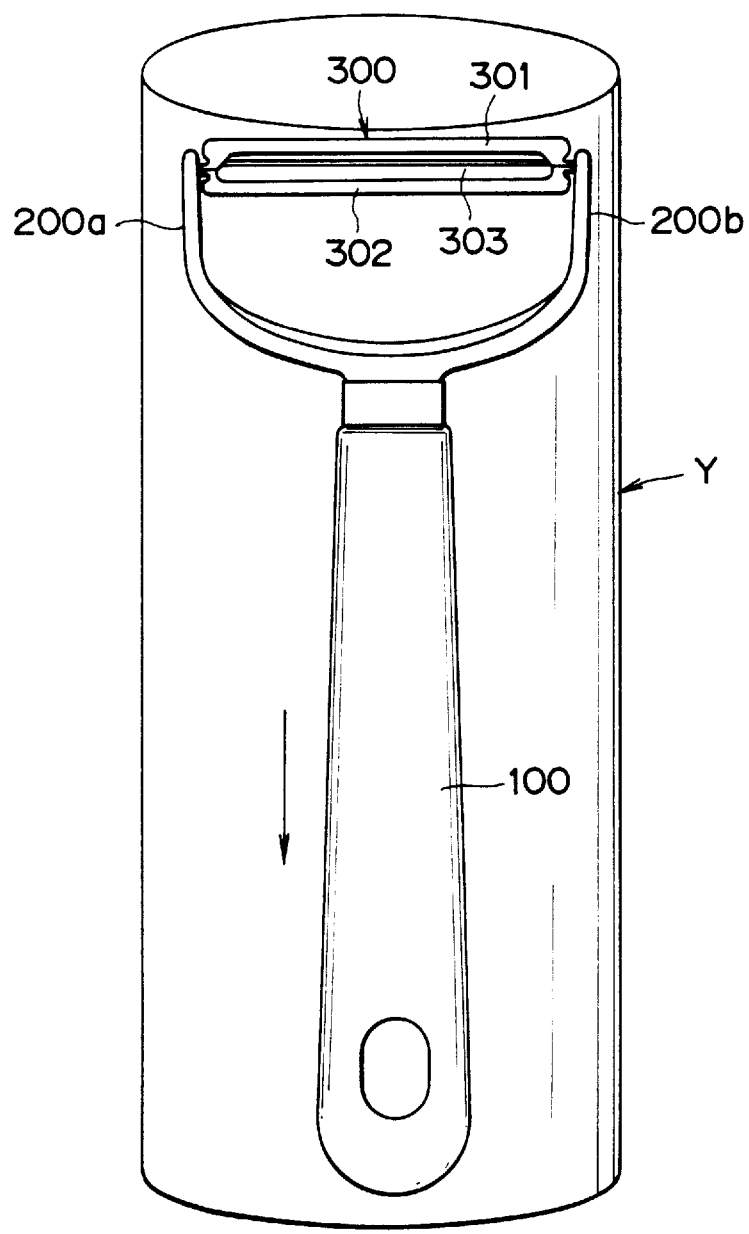
FIG. 8 is a view similar to FIG. 6 illustrating a known peeler in an operating state.

The plate member 4 is oriented so that, as shown in FIGS. 2 and 6, the cutting blade 3 can peel a fruit or vegetable Y with the first face 4a of the plate member 4 being maintained in sliding contact with the fruit or vegetable Y and with a thumb F of a user being maintained in contact with the second face 4b, when the peeler X is moved relative to the fruit or vegetable Y in the direction from the fore end 12 to the rear end 11.

Figure 4:
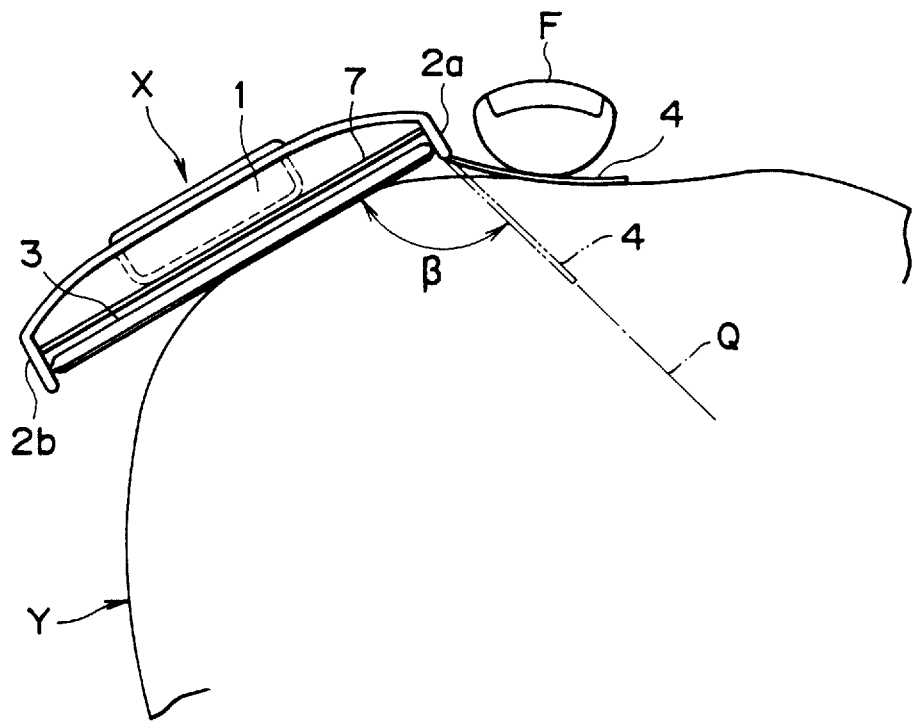
FIG. 4 is a front view, as seen from the direction A in FIG. 1, of the peeler in an operating state.

Thus, the plate member 4 is generally oriented such that the longitudinal axis P thereof crosses the longitudinal axis L of the handle 1 at an angle $\alpha$ which is in the range of about 5°–30° as shown in FIG. 1. Further, as shown in FIG. 4, the lateral axis Q of the plate member 4 which is normal to the longitudinal axis P thereof is oriented such that the angle $\beta$ between the axis Q of the plate member 4 and the cutting blade 3 is generally in the range of 120°–140°.

It is preferred that the plate member 4 be slightly resilient, such as a thin plastic plate, so that the angles $\alpha$ and $\beta$ can be varied as desired by the user during the peeling operation. As schematically shown in FIG. 4, for example, the plate member 4 in a state where no force is acted thereon (shown by the two-dotted line) is deformed into the state shown by the solid line, so that the angle $\beta$ is increased during the peeling operation. Thus, the angle $\beta$ can be increased or decreased within the range of 100°–160°. It is also preferred that the plate member 4 be transparent for reasons of visibility of the fruits and vegetables through the plate member 4 during the peeling operation.

As best seen in FIGS. 3 and 5, a longitudinally extending cutter 5 is fixedly secured to the rear end 11 of the handle 1. The cutter 5 has an arcuate, transversely extending blade at a terminal end thereof. For the safety sake, a sheath 6 is supported on the handle and slidable between an extended position (as shown in FIG. 3 and as shown by the two-dotted line in FIG. 1) where the cutter 5 is covered therewith and a retracted position (as shown in FIG. 5 and as shown by the solid line in FIG. 1) where the cutter 5 is exposed. The sheath 6 can be temporarily maintained at the extended and retracted positions by any suitable means such as by engagement between protrusions and depressions (not shown) provided on an interior wall of the sheath 6 and an exterior wall of the handle 1.

The cutter 5 preferably has a thickness of 0.5–1 mm, a width of 25–35 mm and a length (portion extended from the rear end 11 of the handle 1) of 15–30 mm and is made of a stainless steel.

The cutter 5 is used, as shown in FIG. 5, for removing a core portion Yb of a fruit or vegetable Y along a line C. Namely, by piercing the cutter 5 a few times along the line C, the core portion Yb can be cut away.

A mirror 7 is suitably provided in the area shown by the one-dotted line in FIG. 2. The mirror 7 extends from a portion adjacent the fore end 12 of the handle 1 to a portion adjacent the upper blade plate 31 and is attached to the back surface 1c of the handle 1, such that, as shown in FIG. 3, the operating cutter edge of the blade plate 31 can see by reflection in the mirror 7. The mirror is advantageously utilized to see a boundary Yf between a peeled portion Yc and non-peeled portion Yd in FIG. 2.

FIG. 2 depicts an operating state of the peeler X for peeling a round fruit Y. The peeler X is gripped at the handle 1 by the right hand of a user with the user's right hand thumb F being in contact with the second face 4b of the plate member 4. Then the peeler X is positioned such that the cutting blade 3 is located on a desired portion of the surface of the fruit Y grasped by the user's left hand. The fruit Y is then rotated while maintaining the first face 4a of the plate member 4 in sliding contact with the fruit Y, while maintaining the thumb F in contact with the second face 4b of the plate member 4 and while maintaining the lower engaging plate 32 of the cutting blade in sliding contact with the fruit Y, so that the cutting blade 3 peels the fruit Y with the resulting peel Ya passing through the slit 33 of the cutting blade 3. In the case of a columnar vegetable Y as shown in FIG. 6, the peeler X is moved downward (in the direction from the fore end 12 to the rear end 11.

The embodiment shown above is used for a right-handed user. For a left-handed user, the plate member 4 is provided on the second head portion 2b and the orientation of the cutting blade 3 and the length of the head portions 2a and 2b are changed correspondingly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A peeler for fruits and vegetables comprising:
   a handle extending along a longitudinal axis between opposing fore and rear ends;
   a pair of first and second head portions diverging from said fore end within a first plane and terminating at respective tip ends thereof such that said tip ends of said first and second head portions are transversely spaced apart from each other;

a transversely extending cutting blade defining a transverse axis within said first plane and supported between said first and second head portions at positions adjacent said tip ends, said cutting blade having a cutting edge defining a cutting side for the peeler; and an elongated plate member having opposing first and second faces and an edge fixedly secured to said first head portion on said cutting side and extending away from said first plane at an angle $\beta$, whereby said cutting blade can peel the fruits and vegetables with said first face of said plate member being maintained in sliding contact therewith when said peeler is moved relative to a fruit or vegetable in the direction from said fore end to said rear end with said cutting edge pressed against the fruit or vegetable.

2. A peeler as claimed in claim 1, wherein said plate member has sufficient resiliency that angle $\beta$ significantly increases when said cutting blade and said first face are pressed against the fruit or vegetable.

3. A peeler as claimed in claim 1, further comprising a longitudinally extending cutter protruded from said rear end of said handle and having a transversely extending blade at a terminal end of said cutter.

4. A peeler as claimed in claim 3, further comprising a sheath supported on said handle and moveable between an extended position where said cutter is covered therewith and a retracted position where said cutter is exposed.

5. A peeler as claimed in claim 1, wherein said cutting blade is oriented at an angle offset from the direction normal to said longitudinal direction.

6. A peeler as claimed in claim 1, further comprising a mirror secured to said handle and extending adjacent said cutting blade so that said cutting blade can be seen by reflection in said mirror during peeling of a fruit or vegetable.

7. A peeler as claimed in claim 1 wherein said angle $\beta$ is 120°–140°.

8. A peeler as claimed in claim 1 wherein said transverse axis is at angle $\theta$ relative to said longitudinal axis and wherein $\theta$ is 75°–85°.

9. A peeler as claimed in claim 1 wherein said first plane is inclined relative to said longitudinal axis.

* * * * *